(12) United States Patent
Wishart et al.

(10) Patent No.: US 12,027,950 B2
(45) Date of Patent: Jul. 2, 2024

(54) COUNTER-ROTATING DIFFERENTIAL ELECTRIC MOTOR ASSEMBLY

(71) Applicant: CR FLIGHT L.L.C., Carmichael, CA (US)

(72) Inventors: Randell J. Wishart, Reno, NV (US); Jonathan D. Emigh, Somerset, CA (US); Jason Emigh, Somerset, CA (US); Ray Porter, La Verkin, UT (US)

(73) Assignee: CR FLIGHT L.L.C., Carmichael, CA (US)

( * ) Notice: Subject to any disclaimer, the term of this patent is extended or adjusted under 35 U.S.C. 154(b) by 306 days.

(21) Appl. No.: 17/678,199

(22) Filed: Feb. 23, 2022

(65) Prior Publication Data

US 2022/0239187 A1 Jul. 28, 2022

Related U.S. Application Data

(63) Continuation of application No. PCT/US2020/047836, filed on Aug. 25, 2020.
(Continued)

(51) Int. Cl.
*H02K 7/00* (2006.01)
*B64D 27/24* (2006.01)
(Continued)

(52) U.S. Cl.
CPC ............... *H02K 5/24* (2013.01); *B64D 27/24* (2013.01); *H02K 1/2791* (2022.01); *H02K 7/003* (2013.01);
(Continued)

(58) Field of Classification Search
CPC . H02K 7/08; H02K 7/116; H02K 7/14; H02K 21/22; H02K 23/44; H02K 23/60; H02K 13/003; H02K 16/005
See application file for complete search history.

(56) References Cited

U.S. PATENT DOCUMENTS 1,493,859 A 5/1924 Himes
2,774,898 A 12/1956 Le Tourneau
(Continued)

FOREIGN PATENT DOCUMENTS

CA 3044856 A1 6/2018
CN 201061064 5/2008
(Continued)

OTHER PUBLICATIONS

European Patent Office (EPO), Communication (Supplementary European Search Report) issued Sep. 25, 2023, related patent application No. 20857625.6, pp. 1-5, with claims searched, pp. 6-7.
(Continued)

*Primary Examiner* — Bryan R Perez
(74) *Attorney, Agent, or Firm* — O'BANION & RITCHEY LLP; James M. Ritchey

(57) ABSTRACT

An improved counter-rotating (CR) differential electric motor assembly is utilized to power an aircraft vehicle or fan for moving a gas and includes two oppositely rotating propellers that may be mounted to horizontal flight and vertical lift-off aircraft or a fan housing in spaces similar in size to mounting spaces for traditional motors having only one propeller and includes a hollow central shaft and slip ring assembly that is mounted either within, slight above, or total above oppositely rotating components and around the hollow central shaft.

3 Claims, 13 Drawing Sheets

Related U.S. Application Data

(60) Provisional application No. 62/993,594, filed on Mar. 23, 2020, provisional application No. 62/893,290, filed on Aug. 29, 2019, provisional application No. 62/893,293, filed on Aug. 29, 2019.

(51) Int. Cl.

| | | |
|---|---|---|
| *H02K 1/2791* | (2022.01) | |
| *H02K 5/24* | (2006.01) | |
| *H02K 7/14* | (2006.01) | |
| *H02K 13/00* | (2006.01) | |
| *H02K 21/24* | (2006.01) | |
| *H02K 23/60* | (2006.01) | |
| *B64C 11/48* | (2006.01) | |

(52) U.S. Cl.
CPC ............ *H02K 7/14* (2013.01); *H02K 13/003* (2013.01); *H02K 21/24* (2013.01); *H02K 23/60* (2013.01); *B64C 11/48* (2013.01)

(56) References Cited

U.S. PATENT DOCUMENTS

| | | | | |
|---|---|---|---|---|
| 4,011,488 | A | 3/1977 | Hanagan | |
| 4,175,809 | A | 11/1979 | Dusko | |
| 5,470,236 | A | 11/1995 | Wissler | |
| 5,704,792 | A | 1/1998 | Sobhani | |
| 5,923,114 | A | 7/1999 | Senni | |
| 6,249,058 | B1 | 6/2001 | Rea | |
| 6,299,454 | B1 | 10/2001 | Henderson | |
| 6,561,813 | B2 | 5/2003 | Rutten | |
| 6,914,362 | B2 | 7/2005 | Lungu | |
| 8,198,773 | B2 | 6/2012 | Wishart | |
| 8,253,294 | B1 | 8/2012 | Wishart | |
| 8,531,072 | B2 | 9/2013 | Wishart | |
| 10,116,187 | B1 * | 10/2018 | Wishart | B64D 27/24 |
| 2003/0129855 | A1 | 7/2003 | Douglas | |
| 2010/0236849 | A1 | 9/2010 | Wishart | |
| 2014/0184016 | A1 | 7/2014 | Bizjak | |
| 2017/0217566 | A1 | 8/2017 | Ichinose | |
| 2019/0140521 | A1 | 5/2019 | Deuke | |
| 2021/0218319 | A1 | 7/2021 | Arcand | |

FOREIGN PATENT DOCUMENTS

| | | |
|---|---|---|
| CN | 201294321 | 8/2009 |
| CN | 203260880 | 10/2013 |
| CN | 107040087 | 8/2017 |
| EP | 2294677 | 3/2011 |
| EP | 2928028 | 10/2015 |
| KR | 20110071110 | 6/2011 |
| WO | 2018106611 | 6/2018 |
| WO | 2018106611 A1 | 6/2018 |
| WO | 2021041434 | 3/2021 |
| WO | 2021041435 | 3/2021 |

OTHER PUBLICATIONS

European Patent Office (EPO), Communication (Extended European Search Report) issued Aug. 8, 2023, related patent application No. 20855857.7, pp. 1-8, with claims searched, pp. 9-10.

Canadian Intellectual Property Office (CIPO), examination report issued Aug. 21, 2023, related Canadian patent application No. 3,152,270, pp. 1-5, claims examined, pp. 6-8.

State Intellectual Property Office of the People's Republic of China, the first office action issued Feb. 8, 2024, related Chinese patent application No. 202080060015.0, Chinese-language document, pp. 1-7, machine English translation, pp. 8-13, claims examined, pp. 14-16.

Intellectual Property India, Examination Report issued Feb. 6, 2023, related application No. 202217009885, pp. 1-7, with claims searched 8-10.

ISA/US, United States Patent and Trademark Office (USPTO), International Search Report and Written Opinion issued Dec. 2, 2020, related PCT international application No. PCT/US2020/047837, pp. 1-10, with claims searched, pp. 11-13.

IPEA/US, United States Patent and Trademark Office, International Preliminary Report on Patentability and Written Opinion issued Mar. 1, 2022, related PCT international application No. PCT/US2020/047836, pp. 1-5, claims examined, 6-8.

IPEA/US, United States Patent and Trademark Office, International Preliminary Report on Patentability Issued Oct. 27, 2021, related PCT international application No. PCT/US2020/047837, pp. 1-5, claims examined, 6-7.

ISA/US, United States Patent and Trademark Office (USPTO), International Search Report and Written Opinion issued Dec. 9, 2020, related PCT international application No. PCT/US2020/047836, pp. 1-9, with claims searched, pp. 10-12.

Shchur, Ihor et al., "Stabilization of the Coaxial Counter-Rotating Vertical Axis Wind Turbine via Torque Balancing by Special Double Rotor PMSG", In: 2019 IEEE 2nd Ukraine Conference on Electrical and Computer Engineering (UKRCO N), Lviv, Ukraine, https://sci-hub.do/10.1109/UKRCON.2019.8879977, Jul. 6, 2019, pp. 359-360.

Japan Patent Office (JPO), official action issued Jan. 30, 2024, related Japanese patent application No. 2022-512779, Japanese-language document, pp. 1-3, English-language translation, pp. 4-6, with claims examined, p. 7-9.

* cited by examiner

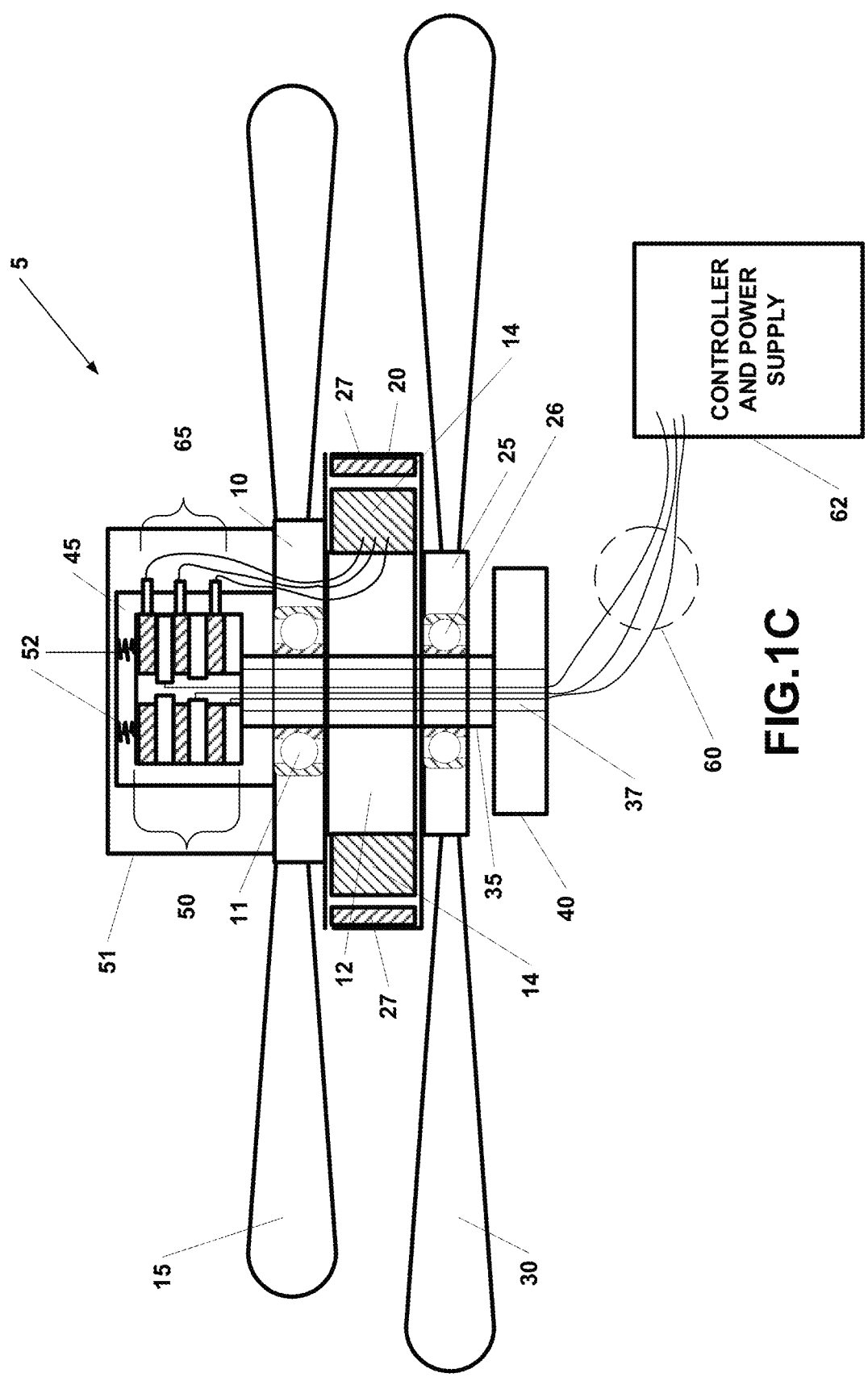

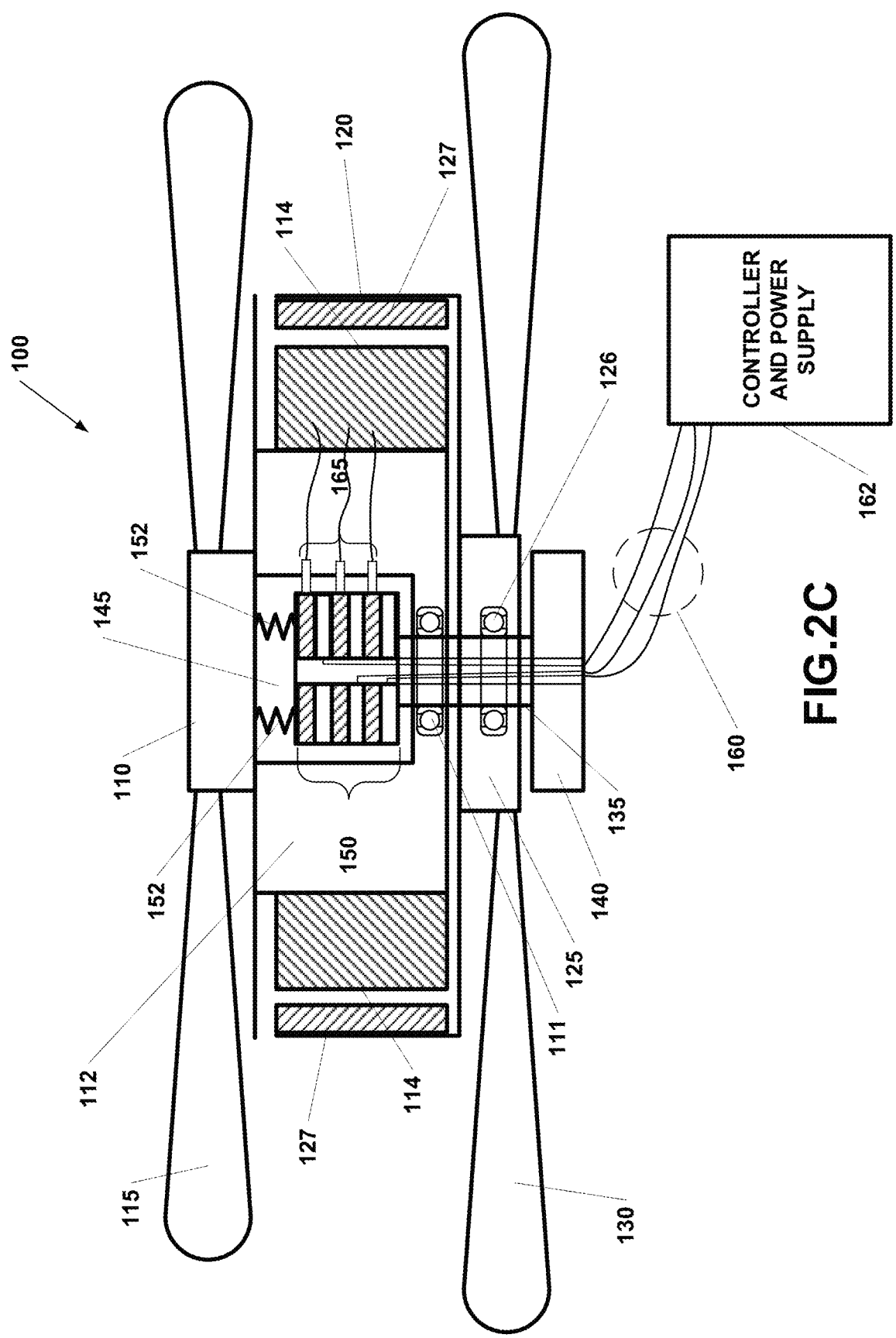

COUNTER-ROTATING DIFFERENTIAL ELECTRIC MOTOR ASSEMBLY

CROSS-REFERENCE TO RELATED APPLICATIONS

This application claims priority to, and is a 35 U.S.C. § 111(a) continuation of, PCT international application number PCT/US2020/047836 filed on Aug. 25, 2020, incorporated herein by reference in its entirety, which claims priority to, and the benefit of, (i) U.S. provisional patent application Ser. No. 62/993,594 filed on Mar. 23, 2020, incorporated herein by reference in its entirety, (ii) U.S. provisional patent application Ser. 62/893,290 filed on Aug. 29, 2019, incorporated herein by reference in its entirety, and (iii) U.S. provisional patent application Ser. No. 62/893,293 filed on Aug. 29, 2019, incorporated herein by reference in its entirety. Priority is claimed to each of the foregoing applications.

The above-referenced PCT international application was published as PCT International Publication No. WO 2021/041434 A1 on Mar. 4, 2021, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a counter-rotating (CR) differential electric motor assembly, normally of medium to large size (10 to >100 lbs of thrust) and frequently utilized for powering an aircraft or for air-movement/fan technologies. More specifically, the subject invention is a CR differential electric motor assembly that is often employed to power horizontal flight and vertical take-off and landing (VTOL) aircraft and permits two associated/linked propellers to rotate very close to one another about a common central axis, wherein the airflow generated by one propeller is differentially coupled into the rotation of the other propeller, thereby increasing the efficiency of power consumption by the CR motor over an equivalent standard/traditional motor that rotates a single propeller. The subject invention may be employed with aircraft or fan housings in spaces that were originally configured for standard/traditional motors.

2. Background Discussion

U.S. Pat. Nos. 8,198,773; 8,253,294; and 8,531,072 (issued to the subject Applicant) are for various counter-rotating motor/generator applications.

Of relevance is U.S. Pat. No. 10,116,187 (issued to the subject Applicant and referred to as patent '187) for a Thin-Profile Counter-Rotating Differential Electric Motor Assembly. In particular, this CR motor assembly is specifically for relatively small electric motors, usually less than about 10 lbs of thrust. As is described in patent '187, the CR motor assembly comprises: central solid shaft (either fixed or rotating) having first and second ends; first and second rotational members that rotate in opposite directions about said central solid shaft; first and second propellers secured to the first and second rotational members, respectfully; electromagnetic means to power the rotation associated with the first and second rotational members; and means for conveying electricity into the electromagnetic means from an outside power source that is located between the oppositely rotating rotational members and a mounting means and is secured to the central solid shaft second end. This specific design is ideal for small CR motors in which the mass of the CR motor (mostly the first and second rotational members and electromagnetic means) is relatively small (about <10 lbs of thrust). However, with medium to large CR motors (about 10 to >100 lbs of thrust) the mass of the first and second rotational members and electromagnetic means becomes significant and to prevent deleterious rotation-created harmonics is the central shaft during operation the first and second rotational members and electromagnetic means need to be as close to the mounting means (base plate) as possible. The CR motor disclosed in patent '187 positions the electricity conveyance means (usually a slip ring assembly or the equivalent) between the first and second rotational members and electromagnetic means and the mounting means thereby placing the first and second rotational members and electromagnetic means at quite a distance from the mounting means. Again, this is perfectly fine for small CR motors, but for CR motors of increased size harmful resonances are easily generated.

In addition, International Publication WO 2018/106611 (also issued to the subject Applicant and referred to as WIPO '611) describes an electricity conveyance means or High Current and RPM-Capable Slip Ring Assembly that can be utilized with the CR motors disclosed in patent '187. However, as with the patent '187 CR motor, this slip ring assembly must be utilized between the first and second rotational member (and associated electromagnetic means) and the mounting means since the electrical wires run from the power source to the outside of the slip ring assemble. The central shaft or axel is solid for this slip ring assemble. To position this slip ring assembly within or above the first and second rotational members (to bring the mass of the first and second rotational member and electromagnetic means closed to the mounting means) is impossible due to the oppositely rotating propellers tangling with the electrical wires.

BRIEF SUMMARY

An object of the technology described herein is to provide a medium to large CR differential electric motor assembly that is utilized to power horizontal flight and vertical take-off and landing aircraft.

An additional object of the technology described herein is to provide a medium to large CR differential electric motor assembly that is utilized to power a fan for the movement of air or other gases.

Another object of the technology described herein is to furnish a medium to large CR differential electric motor assembly, with two propellers, that is utilized to power horizontal flight and vertical take-off and landing aircraft that requires approximately the same space allocation as a traditional/standard motor, with one propeller, does in the aircraft.

A further object of the technology described herein is to supply a medium to large CR differential electric motor assembly that is utilized to power horizontal flight and vertical take-off and landing aircraft with decreased electrical power input relative to mechanical power output when compared with a standard/traditional motor having a single propeller.

Still another object of the technology described herein is to disclose a medium to large CR differential electric motor assembly that is utilized to power horizontal flight and vertical take-off and landing aircraft with increased battery life and more thrust that an equivalent standard/traditional motor.

Still an additional object of the subject invention is to disclose a medium to large CR motor that utilizes a combination of 1) added energy not wasted to a traditional motor mount, 2) added energy due to lower heat production, 3) added energy due to reduced vibrational harmonics created by middle to outer positioning of its slip ring assembly, and 4) synergistic differential coupling between the two oppositely rotating members to increase their net rotational velocities to increase the efficiency of the CR motor over a standard motor.

Disclosed is a medium to large CR differential electric motor assembly utilized to power an aircraft vehicle or fan that comprises: a) a central hollow shaft (or axel) having a first and second ends; b) two oppositely rotating rotational members mounted about the central hollow shaft, wherein a first rotating member includes field coil windings and a second rotating member includes permanent magnets; c) a first set of propeller blades secured to the first rotational member and a second set of propeller blades secured to the second rotational member; d) a slip ring assembly for carrying electricity to the field coils from an electric power supply and controller that is located either around the central hollow shaft and within the first and second rotational members or totally or partially above (towards the first end) of the central hollow shaft; e) a mounting base for securing the CR motor assembly to the vehicle or fan; f) optionally, the control means for operating the CR motor assembly; g) and optionally, the electric power supply.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1C is a cross-sectional view of the embodiment seen in FIG. 1A.

FIG. 2C is a cross-sectional view of the embodiment seen in FIG. 2A.

DETAILED DESCRIPTION

Figure 1A:
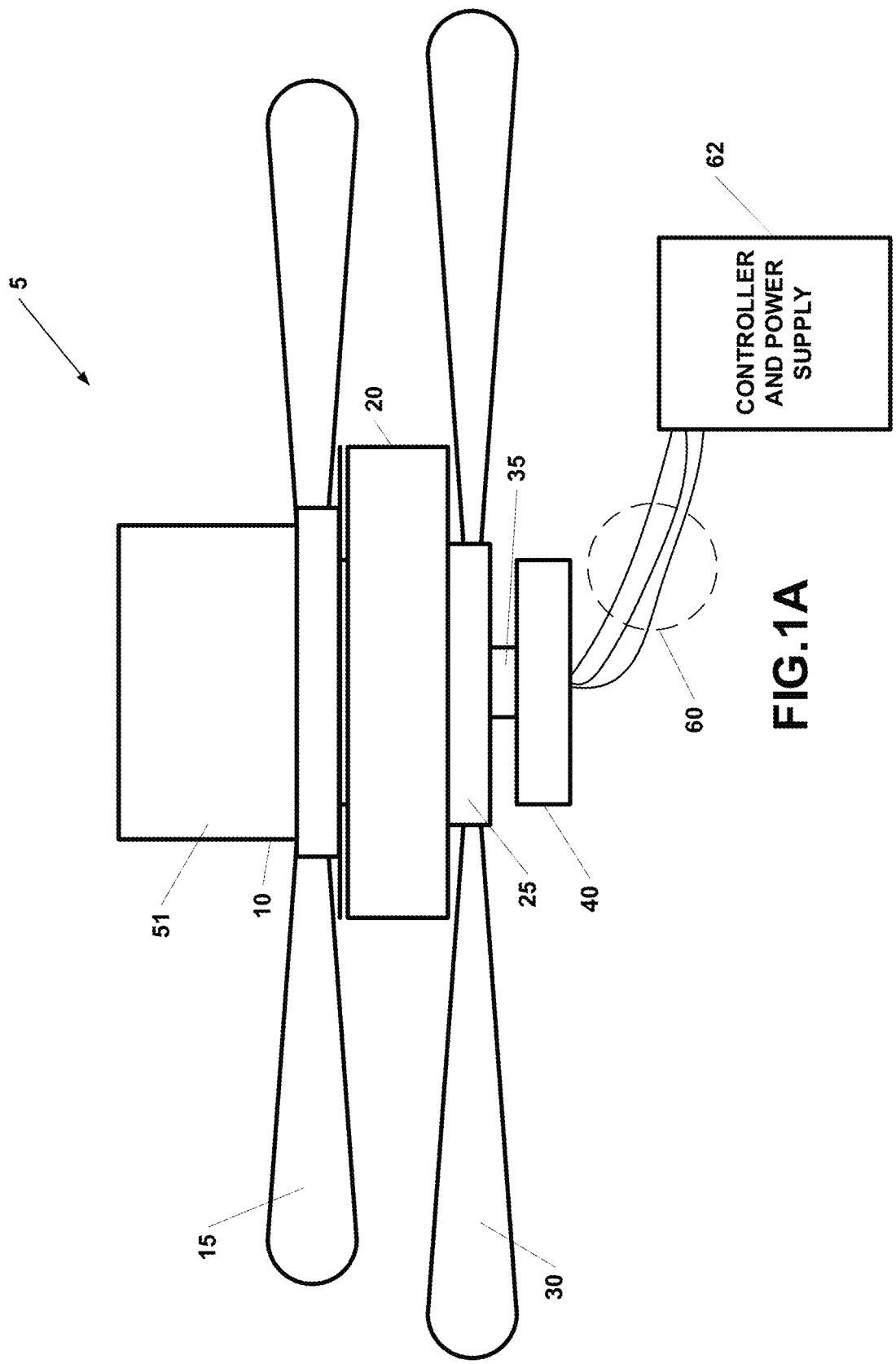
FIG. 1A is a side view of an embodiment of the subject invention in which the slip ring assembly is located either partially or totally above the first and second rotational members and around the central hollow shaft.

Referring more specifically to the drawings, for illustrative purposes the subject technology is embodied in the system generally shown in FIGS. 1 through 9. It will be appreciated that the subject system CR differential electric motor assembly may vary as to configuration and as to details of the components, and that the method may vary as to the specific steps and sequence of operation, without departing from the basic concepts as disclosed herein.

The subject small to large CR motor may be of any desired electrical phase configuration, however, for exemplary purposes only and not by way of limitation, the CR motor related herein is a brushless electrical three-phase design. Other phase designs function equally as well as the current three-phase version. A suitable controller and power supply are employed to operate the subject CR motor.

Generally, the subject invention is a medium (about >10 lbs thrust) to large (about >100 lbs thrust) CR differential electric motor assembly utilized to power an aircraft vehicle or a fan for moving a gas. With a CR motor (or any medium to large motor) that has significant mass associated with its components, positioning the rotational components motor closer to the mounting base helps eliminate harmful rotational vibrations that reduce thrust, waste energy, wear bearings, and create deleterious heat. The subject CR motor comprises: a) a central hollow shaft having outer (first) and inner (second, in the mounting base region) ends and oriented along a central axis that provides structural support for the CR differential electric motor assembly; b) an inner (first) rotational member secured to electromagnetic field coils around its outer perimeter, wherein the inner rotational member rotates, during operation, in a first direction about the central axis; c) a first bearing assembly secured to the inner rotational member that permits the inner rotational member to rotate in the first direction about the central axis; d) an outer rotational member that rotates, during operation, about the central axis in an opposite second direction to the first rotational member; wherein the outer rotational member is lined with a plurality of permanent magnets that are repelled by the electromagnetic field coils, when energized; e) a second bearing assembly secured to the outer rotational member that permits the outer rotational member to rotate in the second direction opposite to the first rotational direction about the central axis; f) a first propeller assembly secured to the inner rotational member, wherein the first propeller assembly comprises at least two propeller blades; g) a second propeller assembly secured to the second rotational member, wherein the second propeller assembly comprises at least two propeller blades; h) a mounting base member secured to the second end of the central hollow shaft; and h) a slip ring assembly for carrying electricity to the field coil windings from an outside controller and power supply, wherein the slip ring assembly is positioned either within the first and second rotational members about the central hollow shaft or slightly projecting above or totally above the first and second rotational members about the central hollow shaft.

It is stressed that the following description relates specifically to horizontal flight and VTOL aircraft for exemplary purposes only and not by way of limitation and that the subject CR motor invention is also employed for air moving devices such as fans in homes or commercial buildings.

More specifically, as shown in FIGS. 1A, 1B, 1C, and 3 a first embodiment of the subject invention 5 is shown in which a slip ring assembly is positioned above the two oppositely rotating rotational members. Generally, this embodiment includes a first rotational member that comprises both an outer portion 10 and inner portion 12 that are rotational secured by bearings 11 to a central hollow shaft 35. For clarity, "outer" refers to further away on the central hollow shaft 35 from a mounting base member 40 and "inner" refers to nearer the mounting base member 40. A propeller 15 is fastened to the outer portion 10. The illustrative propeller 15 comprises two blades, but other blade numbers (two, four, etc.) are contemplated to be within the realm of this disclosure. Electromagnetic field coils 14 are secured to the inner portion 12 of the first rotational member.

A second rotational member comprises both an outer portion 20 and an inner portion 25 that are rotational secured by bearings 26 to the central hollow shaft 35. A propeller 30 is fastened to the inner portion 25. Again, the illustrative propeller 30 comprises two blades, but other blade numbers (two, four, etc.) are contemplated to be within the realm of this disclosure. Permanent magnets 27 are secured to and line the inside perimeter of the outer portion 20 of the second rotational member.

Figure 3:
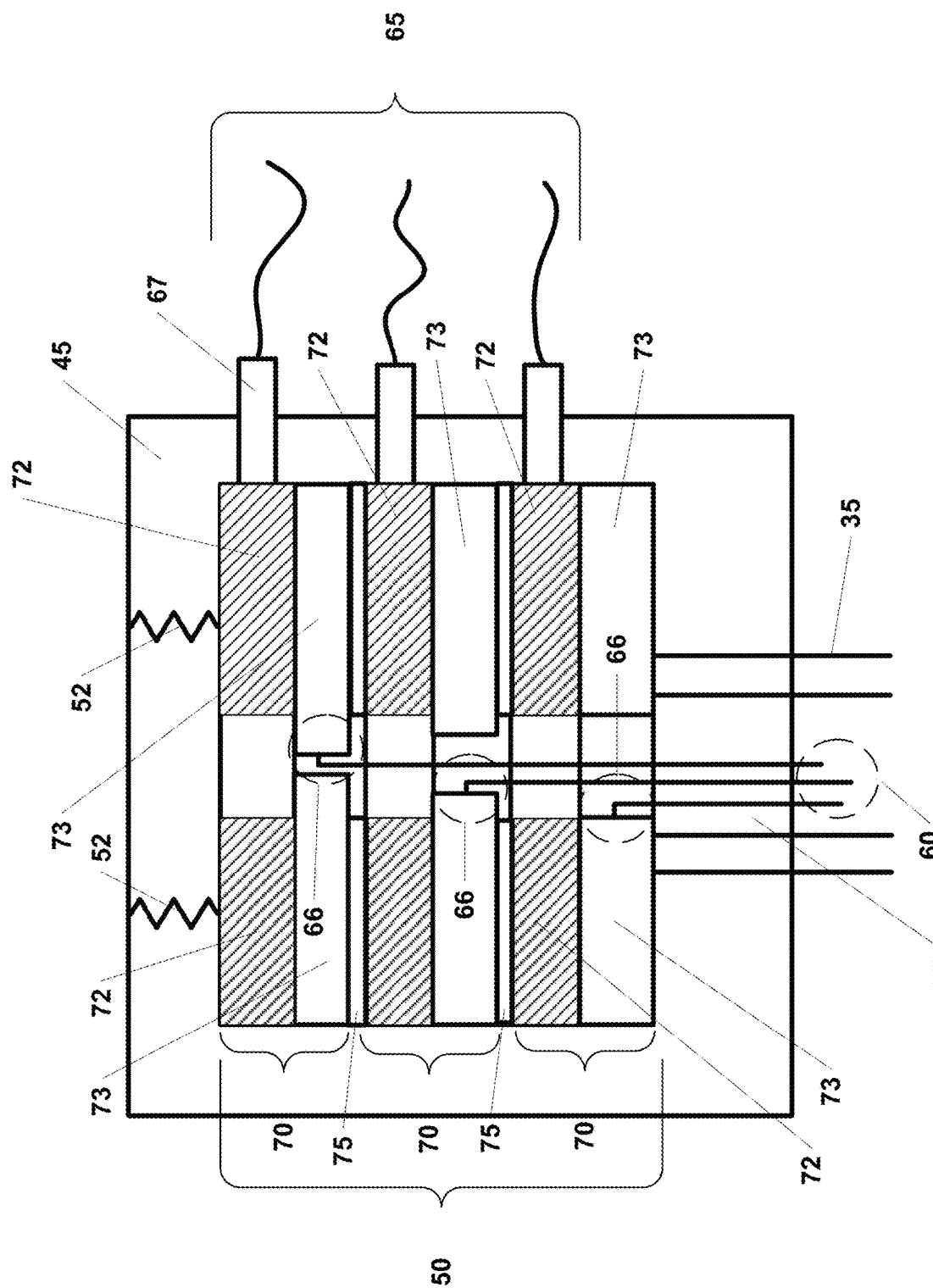
FIG. 3 is a cross-sectional view of the slip ring assembly utilized in FIGS. 1A, 1B, and 1C.

The central hollow shaft 35 is secured to a mounting base 40 and does not rotate during operation of the CR motor. The mounting base may be utilized to secure the subject CR motor to devises such as air vehicles and air moving systems. The central hollow shaft 35 is hollow to permit electrical wiring 60 to pass through it from the exterior controller and power supply 62 to the electricity receiving components of the slip ring assembly (sintered/porous disks 73 as seen in FIG. 3). The wiring 60 attaches at location 66. The central hollow shaft 35 is usually fabricated from a suitable metal or metal alloy, however, structurally acceptable polymers may be employed and has an interior passage 37 through which the wires 60 are positioned. It is stressed that the interior passage 37 is normally round, however, variously cut channels in the central shaft 35 are possible, but the round passage is preferred to prevent harmful rotational resonances.

Since each CR motor has two oppositely rotating members with one having a set of permanent magnets 27 (second rotational member outer portion 20) and the other having field coil windings 14 (first rotational member inner member 12), a non-traditional means is required to deliver electricity to those field coil windings 14. The preferred electricity transfer means for embodiment 5 is a slip ring assembly that can be seen in FIGS. 1B, 1C, and 3. Comprising the slip ring assembly is a set of paired electrically conducting disks 50 that are fabricated from lubricant-containing sintered/porous metals or metal allows (one such readily commercially available sintered/porous material is termed Oilite™). Bronze, brass, steel, and the like are often utilized to produce the sintered disks. The sintered disks contain microscopic passageways which trap an applied lubricant within and slowly release the lubricant during operation. The lubricant may be natural and synthetic oils, with lighter SAE 10(W)-50 preferred, but other viscosities are found to be within the realm of this disclosure.

Normally, it is preferred that both disks in the pairs 70 are lubricated sintered/porous disks, however, it is noted that only one member of each paired set of disks 70 may be sintered/porous and the other a non-sintered/porous material such as a metal or metal alloy, however, it was found that this possibility has much higher wear characteristics during operation of the CR motor. Sintered/porous disks on sintered/porous disks, both lubricated, were found to have extremely low wear characteristics during long term operation (>100 hours) of the CR motors.

Figure 1B:
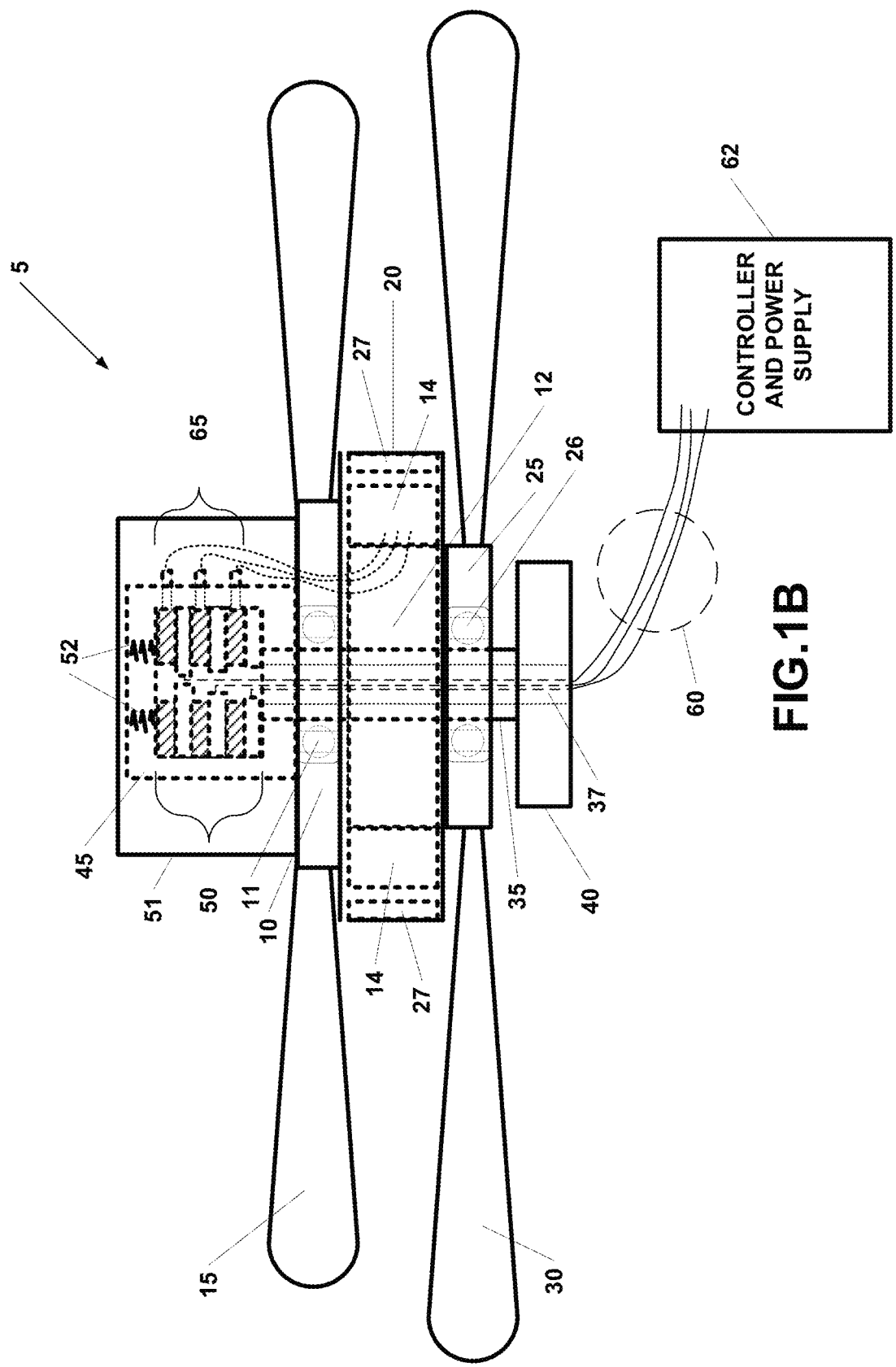
FIG. 1B is a transparent view of the embodiment seen in FIG. 1A.

The set of paired disks shown in FIGS. 1B, 1C, and 3 comprise three pairings 70 with an outer 72 and inner 73 disk in each set. Each incoming electrical connection requires one paired set 70 with outer 72 and inner 73 disks. Thus, the exemplary CR motor 5 utilizes three phase wiring so three wires 60 enter from the controller and power supply 62 into the central hollow shaft opening 37 and continue to the set of three paired disks 50. In each set 70, the inner disk 73 in is held stationary in a spindle housing 45 while the CR motor is operational. Therefore, each of the three incoming wires 60 are secured to one of the stationary inner disks 73. Each pair of disks 70 (outer 72 and inner 73) are electrically isolated from the next pair of disks 70 by an insulator disk 75. The outer disk 72 in each paired set is connected, via an attached tab 67 that locks the outer disks 72 into the spindle housing 45, to an exiting wire 65 that runs to the field coils 14. It is noted that for each set of disks 70 the entering and exiting wires may be switched, as long as one disk in each pair is stationary and one disk is rotational and as long as the entering wires are attached to stationary disks and the exiting wires are secured to the rotational disks. The set of three paired disks 50 are held within a spindle housing 45 that includes resilient means of one or more springs 52 that apply compression to the stacked set of disks for maintaining electrical contact during CR motor operation. The spindle housing 45 is fabricated from non-electrically conductive polymers that are sufficiently rigid such as Delrin, PEEK, various nylons and like materials. The spindle housing 45 and associated components are usually, but not necessarily, surrounded by slip ring assembly cover 51.

It is stressed that, if desired, the outer disks 72 may be the non-rotational disks attached to the incoming wires 60 and the inner disks 73 may be the rotational disks attached to the outgoing/exiting wires 65.

A second embodiment of the subject invention is shown in FIGS. 2A, 2B, 2C, and 4 and includes, generally, a dual propeller CR differential electric motor assembly; comprising: a central hollow shaft having first and second ends; a first rotational member, located about said central hollow shaft, that rotates in a first direction about said central hollow shaft; a first propeller secured to said first rotational member; a second rotational member, located about said central hollow shaft and either within said first and second rotational members or between said first rotational member and said second end of said central hollow shaft, that rotates in an opposite direction to said first rotational member's rotational direction and about said central hollow shaft; a second propeller secured to said second rotational member; electromagnetic field coils and permanent magnets associated with said first and second rotational members for powering, when receiving electricity via wires traveling from an exterior power source through said central hollow shaft, said rotation of said first and second rotational members in opposite directions about said central hollow shaft; a slip ring assembly for transmitting electricity from an exterior power source to said electromagnetic means, wherein said slip ring assembly is located about said central hollow shaft between said first rotational member and said first end of said central hollow shaft; and a base member for mounting said oppositely rotating first and second rotational members, said slip ring assembly, and said central hollow shaft to a supporting structure, wherein said base member is located proximate said second end of said central hollow shaft.

More specifically, FIGS. 2A, 2B, 2C, and 4 relate a second embodiment of the subject invention 100 in which a slip ring assembly is positioned between or slightly above the two oppositely rotating rotational members. For FIGS. 2A, 2B, 2C, and 4 the element indicia are in the 100s and are equivalent to those seen in FIGS. 1A, 1B, 1C, and 3 with the first embodiment, however, the slip ring assembly is lowered into the space within the two oppositely rotating members. Generally, this embodiment includes a first rotational member that comprises both an outer portion 110 and inner portion 112 that are rotational secured by bearings 111 to a central hollow shaft 135. For clarity, "outer" refers to further away on the central hollow shaft 135 from a mounting base member 140 and "inner" refers to nearer the mounting base member 140. A propeller 115 is fastened to the outer portion 110. The illustrative propeller 115 comprises two blades, but other blade numbers (two, four, etc.) are contemplated to be within the realm of this disclosure. Electromagnetic field coils 114 are secured to the inner portion 112 of the first rotational member.

A second rotational member comprises both an outer portion 120 and an inner portion 125 that are rotational secured by bearings 126 to the central hollow shaft 135. A propeller 130 is fastened to the inner portion 125. Again, the illustrative propeller 130 comprises two blades, but other blade numbers (two, four, etc.) are contemplated to be within the realm of this disclosure. Permanent magnets 127 are secured to and line the inside perimeter of the outer portion 120 of the second rotational member.

Figure 4:
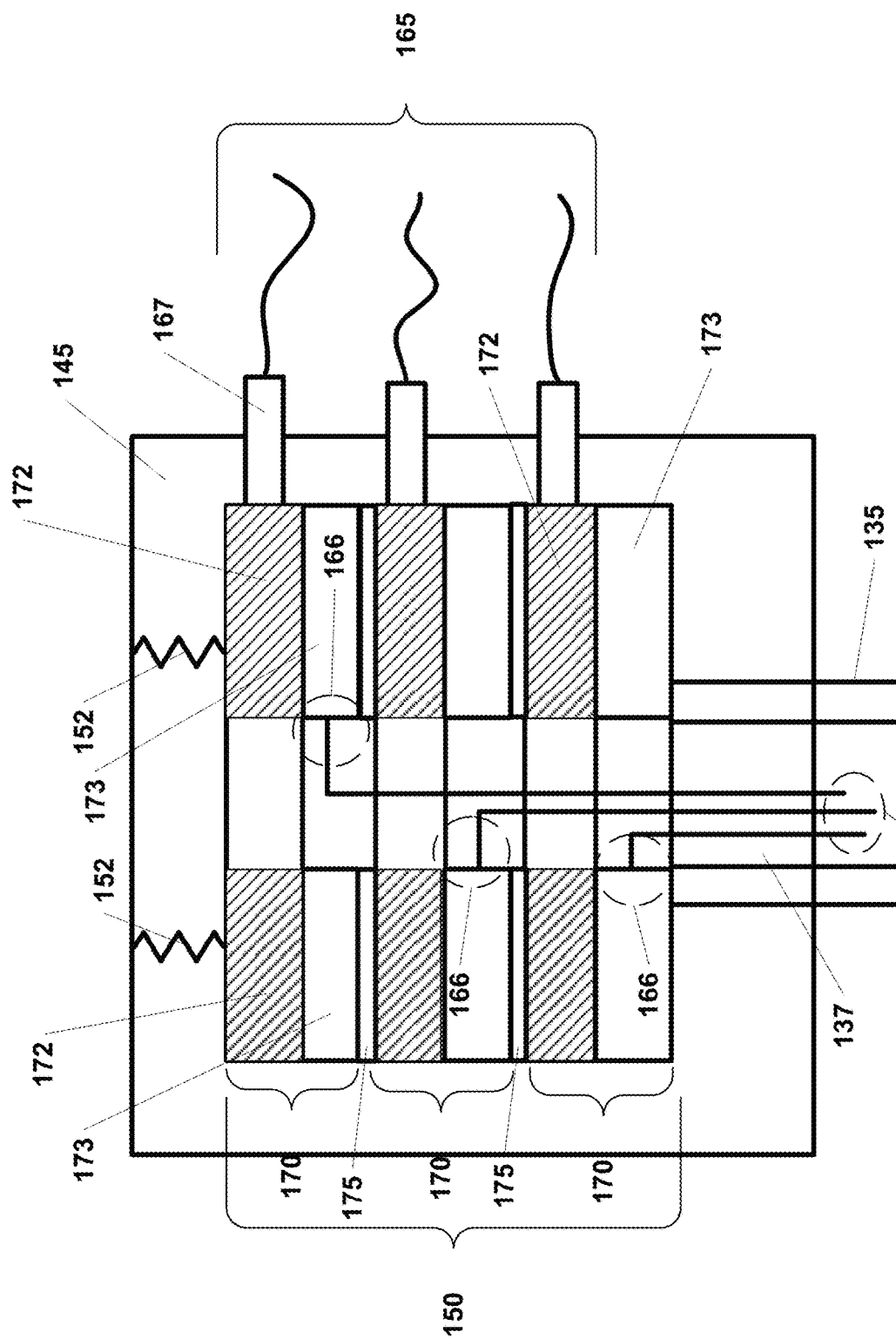
FIG. 4 is cross-sectional view of the slip ring assembly utilized in FIGS. 2A, 2B, and 2C.

The central hollow shaft 135 is secured to a mounting base 140 and does not rotate during operation of the CR motor. The mounting base 140 may be utilized to secure the subject CR motor to devises such as air vehicles and air moving systems. The central hollow shaft 135 is hollow to permit electrical wiring 160 to pass through it from the exterior controller and power supply 162 to the electricity receiving components of the slip ring assembly (sintered disks 173 as seen in FIG. 4). The wiring 160 attaches at location 166. The central hollow shaft 135 is usually fabricated from a suitable metal or metal alloy, however, structurally acceptable polymers may be employed and has an interior passage 137 through which the wires 160 are positioned. It is stressed that the interior passage 137 is normally round, however, variously cut channels in the central shaft 135 are possible, but the round passage is preferred to prevent harmful rotational resonances.

Since each CR motor has two oppositely rotating members with one having a set of permanent magnets 127 (second rotational member outer portion 120) and the other having field coil windings 14 (first rotational member inner member 112), a non-traditional means is required to deliver electricity to those field coil windings 114. The preferred electricity transfer means for embodiment 100 is a slip ring assembly that can be seen in FIGS. 2B, 2C, and 4. Comprising the slip ring assembly is a is a set of paired electrically conducting disks 150 that are fabricated from lubricant-containing sintered/porous metals or metal allows (one such readily commercially available sintered/porous material is termed Oilite™). Bronze, brass, steel, and the like are often utilized to produce the sintered disks. The sintered disks contain microscopic passageways which trap an applied lubricant within and slowly release the lubricant during operation. The lubricant may be natural and synthetic oils, with lighter SAE 10-50 preferred, but other viscosities are found to be within the realm of this disclosure.

Figure 2A:
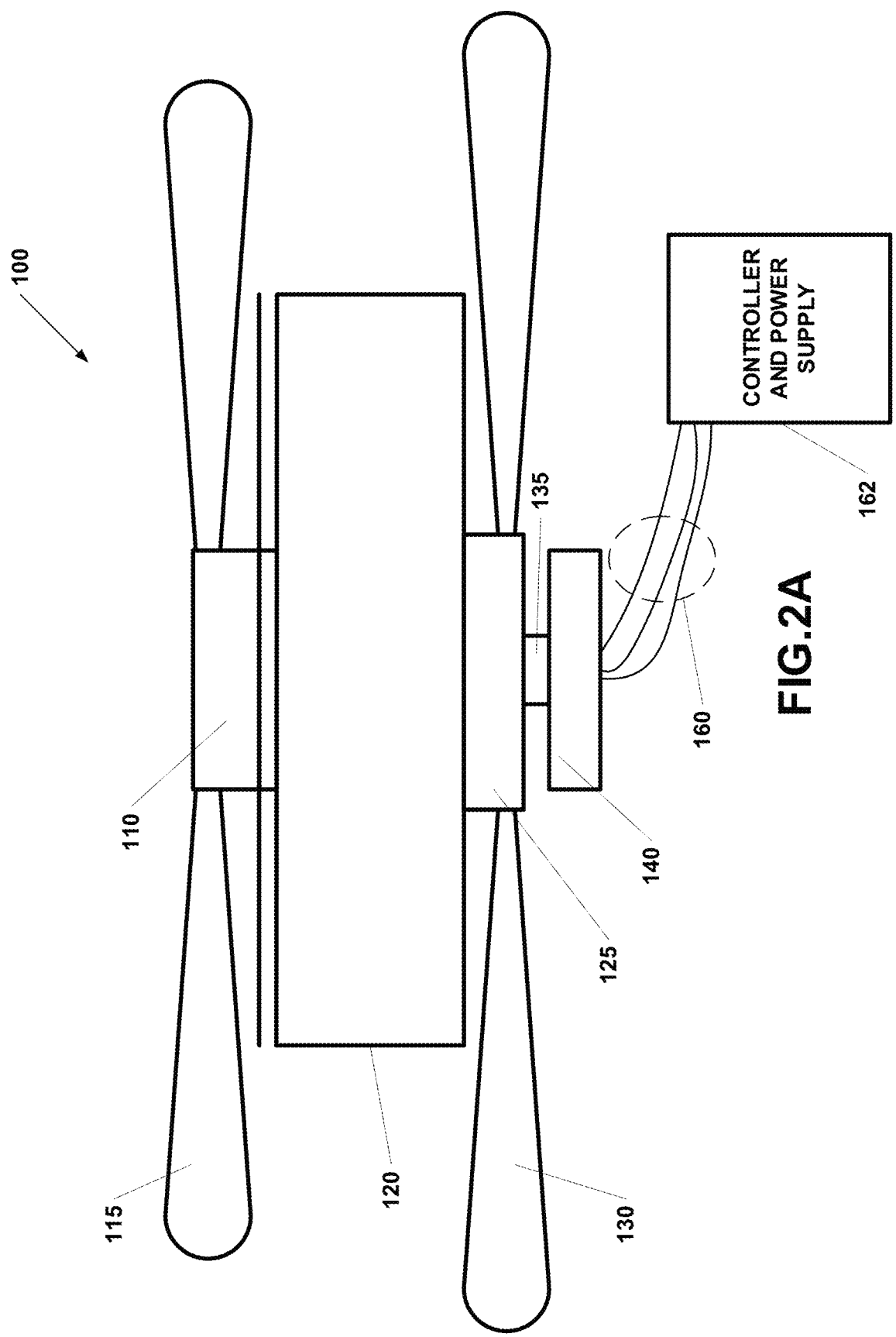
FIG. 2A is a side view of another embodiment of the subject invention in which the slip ring assembly is located within the first and second rotational members and around the central hollow shaft.
Figure 2B:
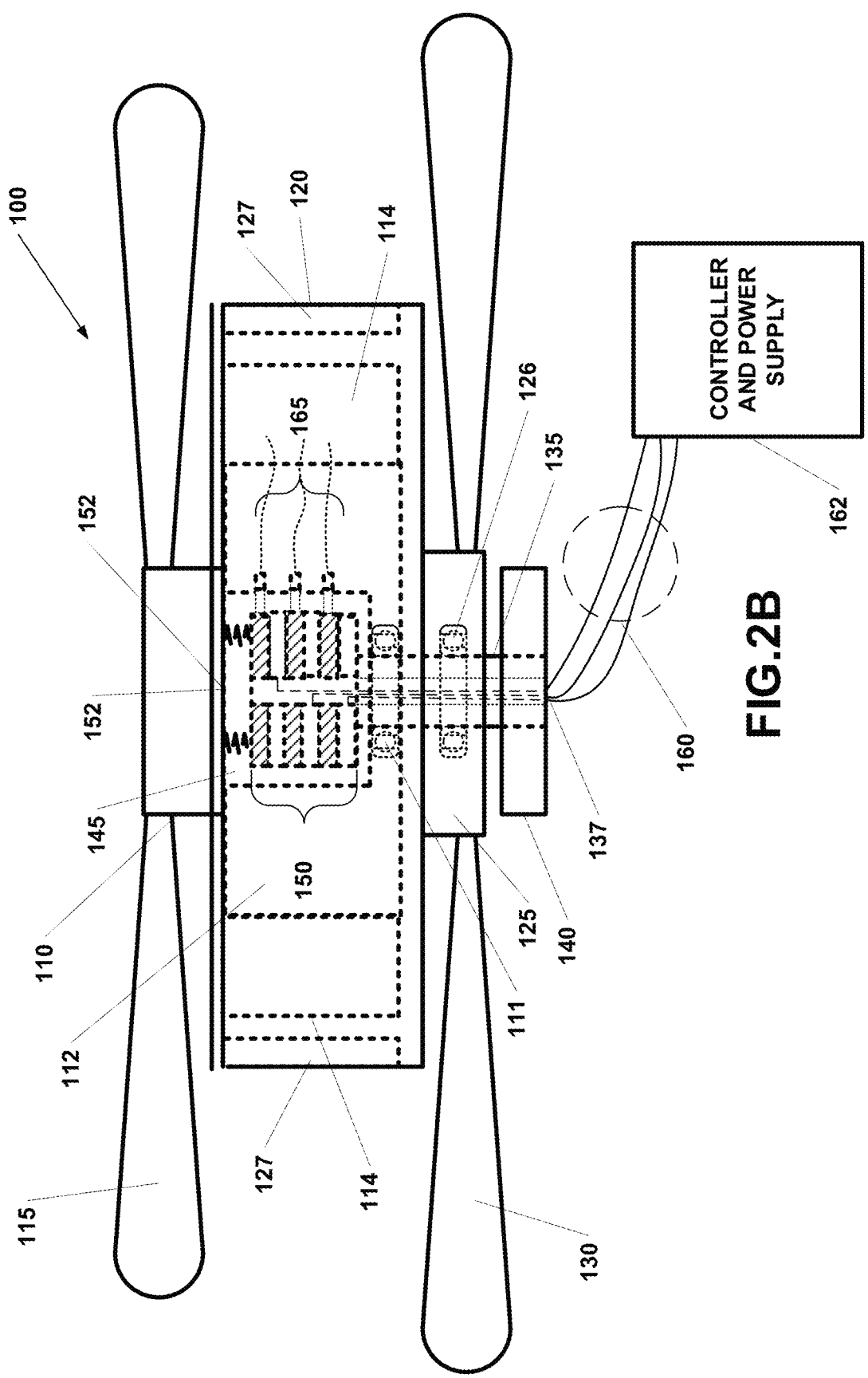
FIG. 2B is a transparent view of the embodiment seen in FIG. 2A.

The set of paired disks shown in FIGS. 2B, 2C, and 4 comprise three pairings 170 with an outer 172 and inner 173 disk in each set. Each incoming electrical connection requires one paired set 170 with outer 172 and inner 173 disks. Thus, the exemplary CR motor 100 utilizes three phase wiring so three wires 160 enter from the controller and power supply 162 into the central hollow shaft opening 137 and continue to the set of three paired disks 150. In each set 170, the inner disk 173 in is held stationary in a spindle housing 145 while the CR motor is operational. Therefore, each of the three incoming wires 160 are secured to one of the stationary inner disks 173. It is noted that for each set of disks 170 the entering and exiting wires may be switched, as long as one disk in each pair is stationary and one disk is rotational and as long as the entering wires are attached to stationary disks and the exiting wires are secured to the rotational disks. Each pair of disks 170 (outer 172 and inner 173) are electrically isolated from the next pair of disks 170 by an insulator disk 175. The outer disks 172 in each paired set is connected, via an attached tab 167 that locks the outer disks 172 into the spindle housing 145, to an exiting wire 165 that runs to the field coils 114. The set of three paired disks 150 are held within the spindle housing 145 that includes resilient means of one or more springs 152 that apply compression to the stacked set of disks 150 for maintaining electrical contact during CR motor operation.

It is stressed that, if desired, the outer disks 172 may be the non-rotational disks attached to the incoming wires 160 and the inner disks 173 may be the rotational disks attached to the outgoing/exiting wires 165.

Figure 5:
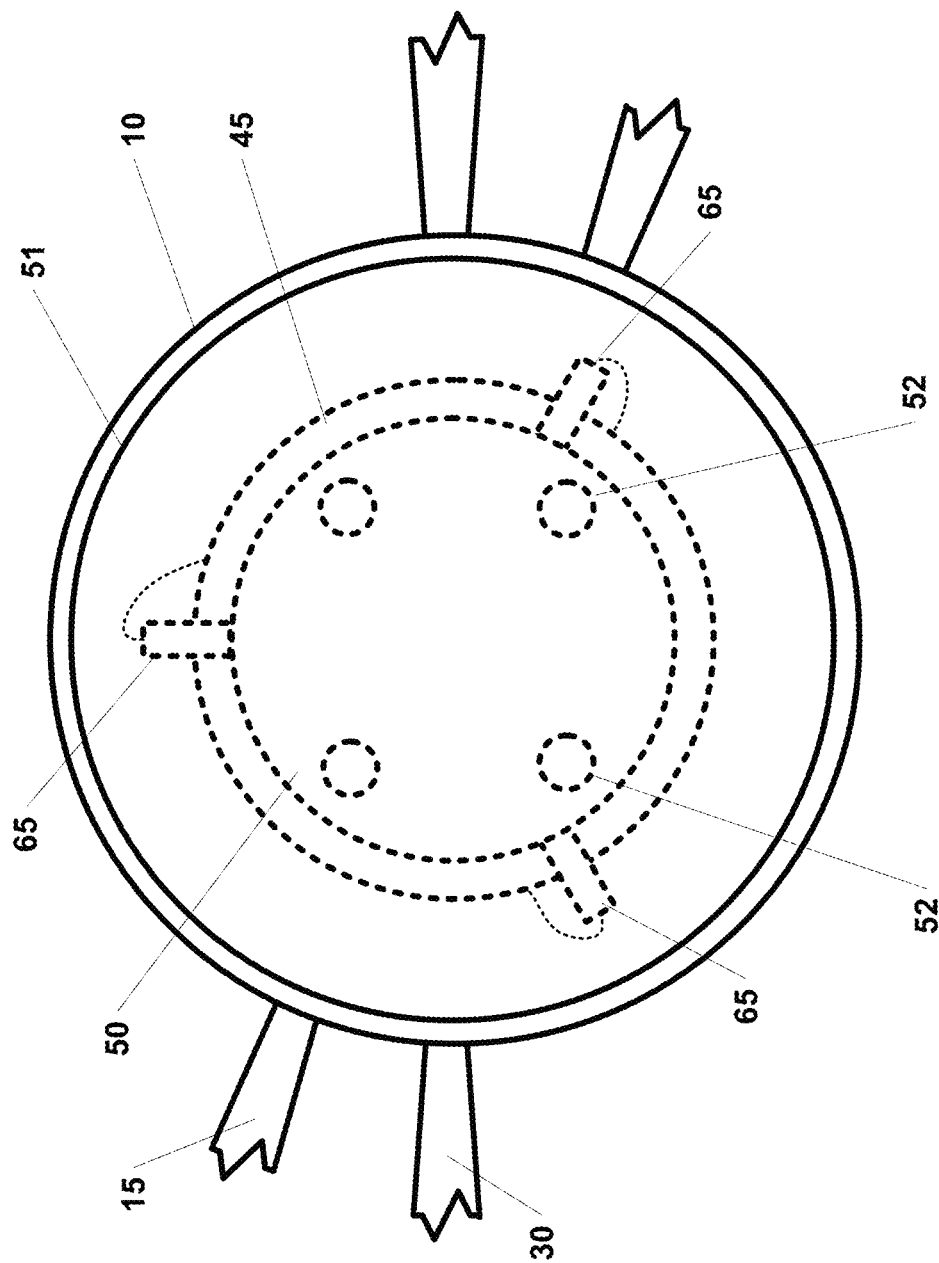
FIG. 5 is a top partially transparent view of another embodiment of the subject invention showing equally spaced slip ring assembly to field coil connections and wires.

FIG. 5 illustrates, for the first CR motor embodiment 5, that a preferred configuration within the slip ring assemble for the exiting disk connections/wires 65 (leading to the field coils 14) is a symmetrical arrangement within the spindle housing 45. The symmetrical arrangement of the connections/wires 65 minimizes any harmful or energy wasting rotational vibrations.

With horizontal flight and VTOL aircraft, the CR motor mount 40 and 140 frequently have apertures that are utilized to secure the subject CR motors 5 and 100 to a selected aircraft. One advantage of the subject CR differential motor assembly 5 and 100 is that they easily fit within the region a traditional/standard motor with propellers fits.

The onboard power supply/source is frequently a suitable battery or batteries. Additionally, a standard and easily purchased electronic speed controller (ESC) is employed to control the incoming electricity to actuate the field coil windings 14 in a pattern that creates the necessary magnetic repulsive forces to power rotation and to initiate and continue rotation.

Usually, an onboard controller with horizontal flight and VTOL aircraft is in remote communication with a ground controller by radio waves, infrared signals, or the equivalent.

The differential or first-to-second propeller-feed-back action of the subject invention is important in explaining the effectiveness or efficiency of the subject invention which has two internally differentially coupled propellers compared with a traditional/standard motor outfitted with only a single propeller. The set of blades on the first propeller encounters oncoming air and increases the velocity of the leaving air. The set of blades on the second propeller encounters the first propeller-accelerated air which causes the second rotational member to rotate faster, which in turn further accelerates the first rotational member and the internally differentially coupled two rotational members operate with a higher efficiency than a motor with only one propeller that provides no synergistic feed-back enhancement between rotational members, as is seen for the CR version.

Figure 6:
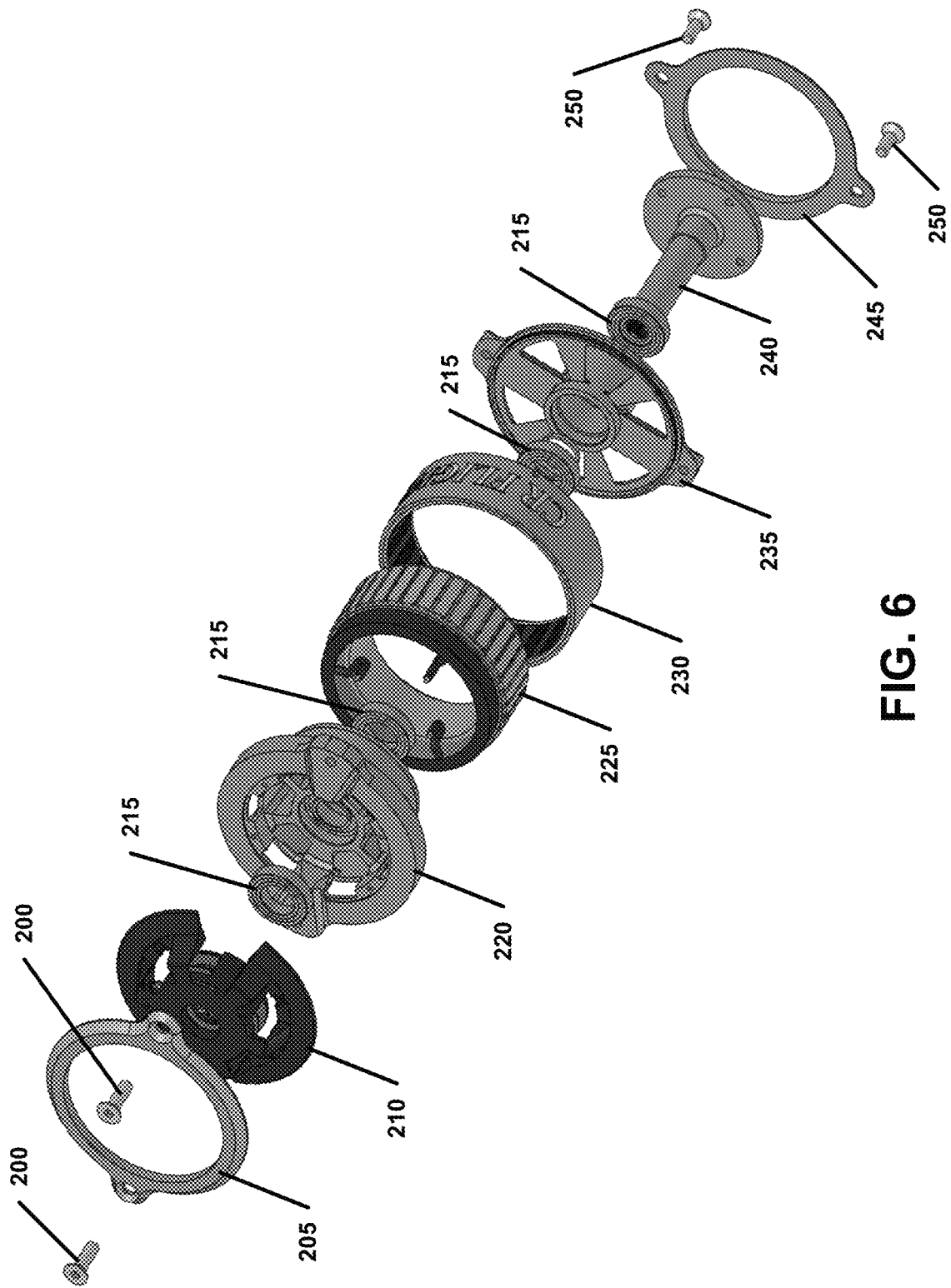
FIG. 6 is an exploded perspective view of an embodiment of the subject invention.

FIGS. 6-9 show an embodiment of the subject technology that was obtained from a CAD program depicting parts for a fully functional CR motor. FIG. 6 depicts an exploded view of the components of one embodiment of the subject technology. It is stressed that other equivalent embodiments are considered to within the realm of this disclosure. An outer retainer ring 205 is secured by attachment screws 200 over a slip ring assembly or "rotary transformer" 210 (see above for a description of a typical slip ring assembly or rotary transformer 50) through which a hollow central shaft or axle 240 extends. Next is a bearing 215 (all other bearings are also given the designation 215) fitted about the hollow central shaft 240. A first rotational member outer portion 220 is next and positioned about the hollow central shaft 240. A first set of propeller blade anchor points are found on the perimeter of the first rotational member outer portion 220 (depending of the exact number of blades desired two or more propeller blade anchor points exist). Positioned next is another bearing 215 (exact bearing 215 positions may vary based on exact requirements of any given specific CR motor). A first rotational member inner portion 225 follows and is, again, positioned about the hollow central shaft. The first rotational member inner portion 225 contains the electromagnetic field coils. Next is the second rotational member outer portion 230. The second rotational member outer portion 230 contains the permanent magnets anchored to the inside surface of the outer portion 230. Within the second rotational member outer portion 230 is another bearing 215 and the second rotational inner member 235 that provides a second set of propeller attachment points. A final bearing 215 follows. An inner retainer ring 245 is secured by attachment screws 250. Clearly, the attachment screws, outer and inner may be substituted with equivalent means.

Figure 7:
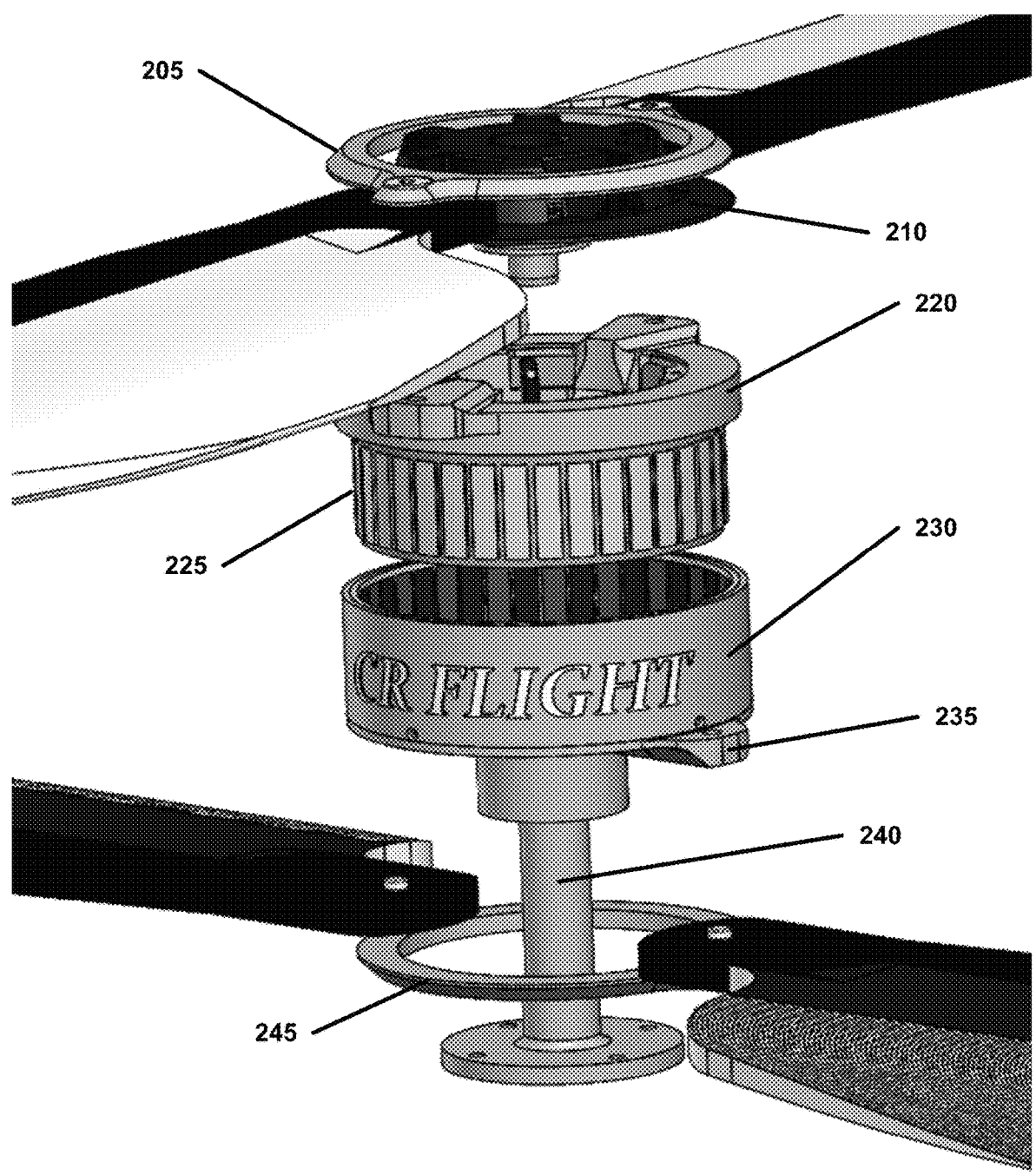
FIG. 7 is a partially exploded vertical view of the embodiment depicted in FIG. 6 (attached propellers are partially shown).

FIG. 7 shows a partially exploded view of one embodiment of the subject CR motor. Propellers are attached to the CR motor.

Figure 8:
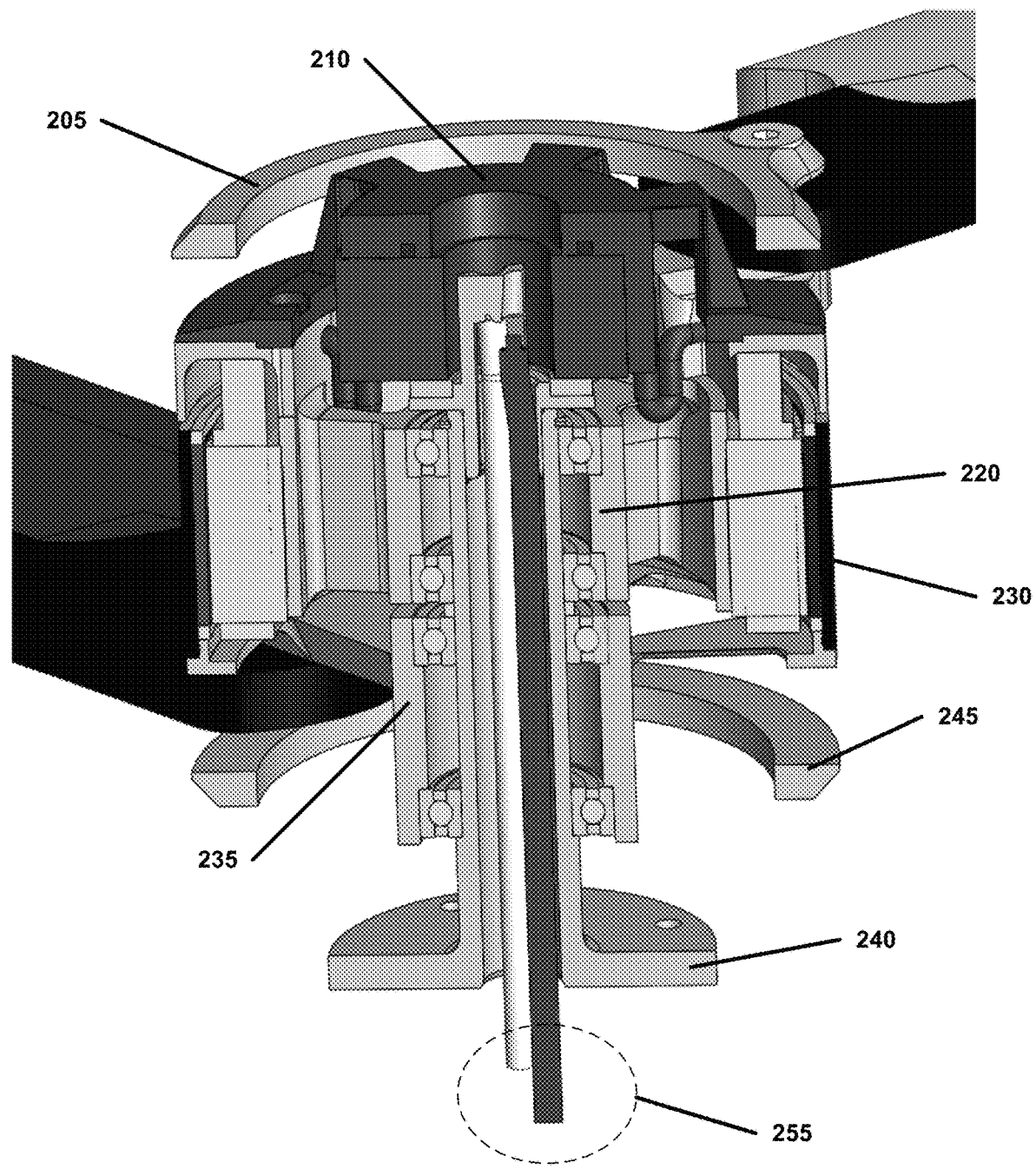
FIG. 8 is a cross-sectional view of the assembled embodiment shown in FIG. 6 (attached propellers are partially shown).

FIG. 8 depicts a cross-sectional view of one embodiment of the assembled CR motor shown in FIGS. 6 and 7. The electric wires 255 are seen running through the interior of the hollow central shaft 240 and up to the slip ring assembly 210 (again, details of the slip ring assembly are described above).

Figure 9:
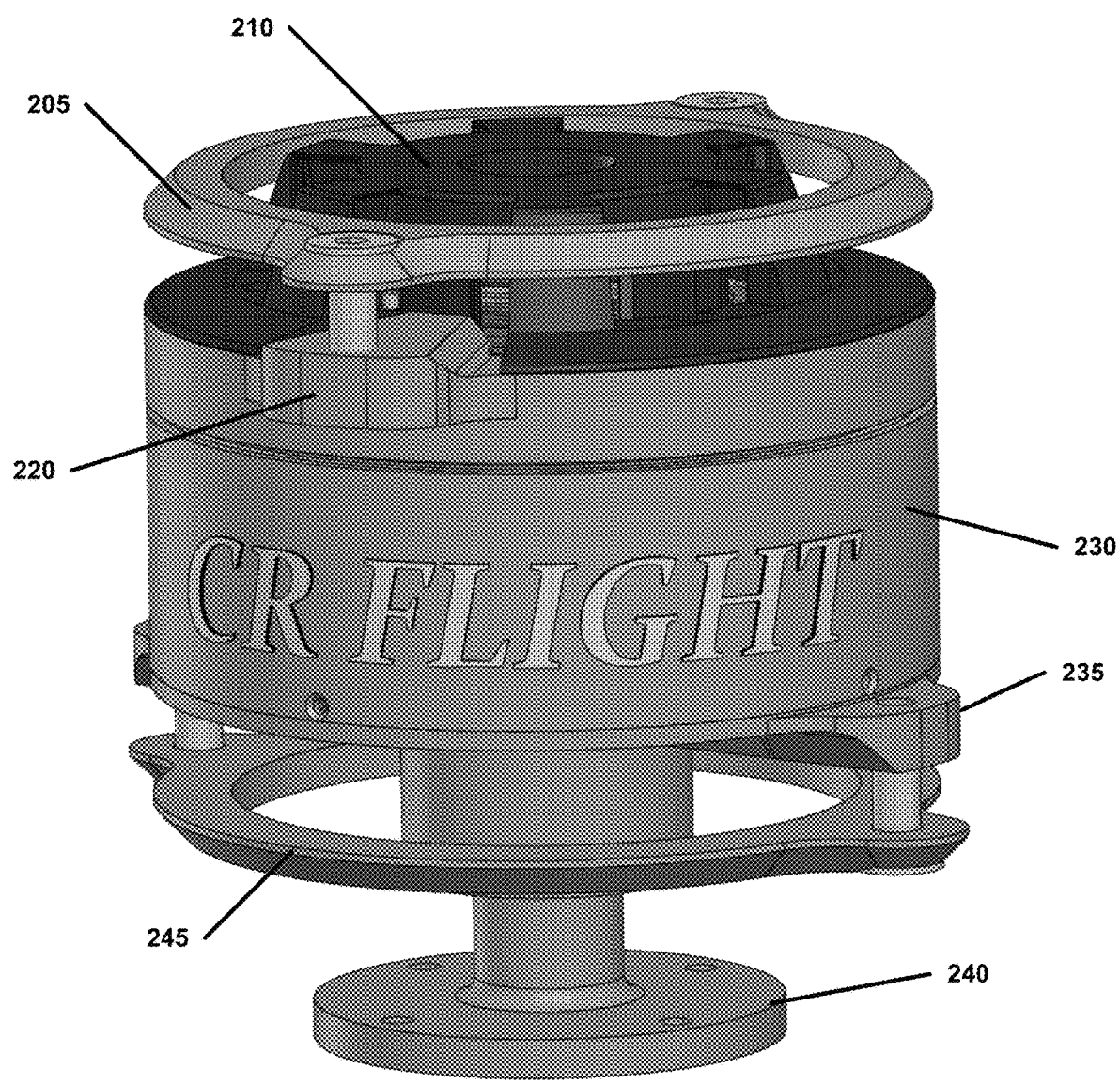
FIG. 9 is an exterior view of the assembled embodiment shown in FIG. 6.

FIG. 9 shows an assembled exterior view of the embodiment seen in FIGS. 6-8.

A first embodiment of the subject invention includes a CR differential electric motor assembly; comprising: a central hollow shaft having first and second ends; a first rotational member, located about said central hollow shaft, that rotates in a first direction about said central hollow shaft; a second rotational member, located between said first rotational member and said second end of said central hollow shaft, that rotates in an opposite direction to said first rotational member's rotational direction and about said central hollow shaft; electromagnetic field coils and permanent magnets associated with said first and second rotational members for powering, when receiving electricity via wires traveling from an exterior power source through said central hollow shaft, said rotation of said first and second rotational members in opposite directions about said central hollow shaft; a slip ring assembly for transmitting electricity from an exterior power source to said electromagnetic means, wherein said slip ring assembly is located about said central hollow shaft and either within said first and second rotational members or between said first rotational member and said first end of said central hollow shaft; and a base member for mounting said oppositely rotating first and second rotational members, said slip ring assembly, and said central hollow shaft to a supporting structure, wherein said base member is located proximate said second end of said central hollow shaft.

A second embodiment of the subject invention includes a dual propeller CR differential electric motor assembly; comprising: a central hollow shaft having first and second ends; a first rotational member, located about said central hollow shaft, that rotates in a first direction about said central hollow shaft; a first propeller secured to said first rotational member; a second rotational member, located about said central hollow shaft and either within said first and second rotational members or between said first rotational member and said second end of said central hollow shaft, that rotates in an opposite direction to said first rotational member's rotational direction and about said central hollow shaft; a second propeller secured to said second rotational member; electromagnetic field coils and permanent magnets associated with said first and second rotational members for powering, when receiving electricity via wires traveling from an exterior power source through said central hollow shaft, said rotation of said first and second rotational members in opposite directions about said central hollow shaft; a slip ring assembly for transmitting electricity from an exterior power source to said electromagnetic means, wherein said slip ring assembly is located about said central hollow shaft between said first rotational member and said first end of said central hollow shaft; and a base member for mounting said oppositely rotating first and second rotational members, said slip ring assembly, and said central hollow shaft to a supporting structure, wherein said base member is located proximate said second end of said central hollow shaft.

A third embodiment of the subject invention comprises an improved CR differential electric motor assembly that includes: a central shaft having first and second ends; a first rotational member, located about the central shaft, that rotates in a first direction about the central shaft; a second rotational member, located between said first rotational member and said second end of the central shaft, that rotates in an opposite direction to said first rotational member's rotational direction and about said central shaft; electromagnetic field coils and permanent magnets associated with the first and second rotational members for powering, when receiving electricity, said rotation of the first and second rotational members in opposite directions about the central shaft; a slip ring assembly for transmitting electricity from an exterior power source to the electromagnetic means; and a base member for mounting the oppositely rotating first and second rotational members, the slip ring assembly, and the central shaft to a supporting structure, wherein the base member is located proximate the second end of the central shaft, wherein said improvement comprises: utilizing a hollow central shaft that allows electrical wires to run within said hollow central shaft and between said slip ring assembly and an exterior power supply and locating said slip ring assembly about said hollow central shaft and either within said first and second rotational members or between said hollow central shaft first end and said first rotational member, thereby positioning said first and second rotational members near said base member to minimize deleterious vibrations during operation of the CR differential electric motor assembly.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A counter-rotating (CR) differential electric motor assembly; comprising:
  a. a central hollow shaft having first and second ends;
  b. a first rotational member, located about said central hollow shaft, that rotates in a first direction about said central hollow shaft;
  c. a second rotational member, located between said first rotational member and said second end of said central hollow shaft, that rotates in an opposite direction to said first rotational member's rotational direction and about said central hollow shaft;
  d. electromagnetic means field coils and permanent magnets associated with said first and second rotational members for powering, when receiving electricity via wires traveling from an exterior power source through said central hollow shaft, said rotation of said first and second rotational members in opposite directions about said central hollow shaft;
  e. a slip ring assembly for transmitting electricity from the exterior power source to said electromagnetic means field coils, wherein said slip ring assembly is located about said central hollow shaft and either within said first and second rotational members or between said first rotational member and said first end of said central hollow shaft; and
  f. a base member for mounting said oppositely rotating first and second rotational members, said slip ring assembly, and said central hollow shaft to a supporting structure, wherein said base member is located proximate said second end of said central hollow shaft.

2. A dual propeller counter-rotating (CR) differential electric motor assembly; comprising:
   a. a central hollow shaft having first and second ends;
   b. a first rotational member, located about said central hollow shaft, that rotates in a first direction about said central hollow shaft;
   c. a first propeller secured to said first rotational member;
   d. a second rotational member, located about said central hollow shaft and either within said first and second rotational members or between said first rotational member and said second end of said central hollow shaft, that rotates in an opposite direction to said first rotational member's rotational direction and about said central hollow shaft;
   e. a second propeller secured to said second rotational member;
   f. electromagnetic means field coils and permanent magnets associated with said first and second rotational members for powering, when receiving electricity via wires traveling from an exterior power source through said central hollow shaft, said rotation of said first and second rotational members in opposite directions about said central hollow shaft;
   g. a slip ring assembly for transmitting electricity from the exterior power source to said electromagnetic means field coils, wherein said slip ring assembly is located about said central hollow shaft between said first rotational member and said first end of said central hollow shaft; and
   h. a base member for mounting said oppositely rotating first and second rotational members, said slip ring assembly, and said central hollow shaft to a supporting structure, wherein said base member is located proximate said second end of said central hollow shaft.

3. An improved counter rotating (CR) differential electric motor assembly that includes: a central shaft having first and second ends; a first rotational member, located about the central shaft, that rotates in a first direction about the central shaft; a second rotational member, located between said first rotational member and said second end of the central shaft, that rotates in an opposite direction to said first rotational member's rotational direction and about said central shaft; electromagnetic means field coils and permanent magnets associated with the first and second rotational members for powering, when receiving electricity, said rotation of the first and second rotational members in opposite directions about the central shaft; a slip ring assembly for transmitting electricity from an exterior power source to the electromagnetic means field coils; and a base member for mounting the oppositely rotating first and second rotational members, the slip ring assembly, and the central shaft to a supporting structure, wherein the base member is located proximate the second end of the central shaft, wherein said improvement comprises:
   a. utilizing a hollow central shaft that allows electrical wires to run within said hollow central shaft and between said slip ring assembly and the exterior power supply and
   b. locating said slip ring assembly about said hollow central shaft and either within said first and second rotational members or between said hollow central shaft first end and said first rotational member, thereby positioning said first and second rotational members next to said base member to minimize deleterious vibrations during operation of the CR differential electric motor assembly.

* * * * *